United States Patent [19]
Kipp

[11] Patent Number: 5,765,220
[45] Date of Patent: Jun. 9, 1998

[54] APPARATUS AND METHOD TO REDUCE INSTRUCTION ADDRESS STORAGE IN A SUPER-SCALER PROCESSOR

[75] Inventor: Donald Kipp, Ft. Collins, Colo.

[73] Assignee: Hewlett-Packard Company, Palo Alto, Calif.

[21] Appl. No.: 664,604

[22] Filed: Jun. 18, 1996

[51] Int. Cl.⁶ .................................................. G06F 12/06
[52] U.S. Cl. ..................... 711/220; 395/382; 395/383; 395/386; 711/213
[58] Field of Search ................. 395/421.03, 421.1, 395/381, 382, 383, 386; 711/213, 220

[56] References Cited

U.S. PATENT DOCUMENTS

| | | | |
|---|---|---|---|
| 3,949,378 | 4/1976 | Crabb et al. | 395/421.1 |
| 4,128,875 | 12/1978 | Thurber et al. | 395/421.1 |
| 4,819,165 | 4/1989 | Lenoski | 395/421.1 |
| 5,136,699 | 8/1992 | Yokoyama | 395/421.1 |
| 5,357,620 | 10/1994 | Suzuki | 395/421.1 |
| 5,465,337 | 11/1995 | Kong | 395/421.1 |
| 5,530,825 | 6/1996 | Black et al. | 395/421.03 |

FOREIGN PATENT DOCUMENTS

| | | | |
|---|---|---|---|
| 0432774A2 | 6/1991 | European Pat. Off. | G06F 9/38 |

OTHER PUBLICATIONS

Mano, M. Morris, Computer System Architecture, 2nd Edition copyright 1982, pp. 243–245, 515–517.
Tomasulo, R.M., "An Efficient Algorithm for Exploiting Multiple Arithmetic Units", IBM Journal, Jan. 1967, pp. 25–33.
Lightner, Bruce D., "The SPARC Lightning Processor", Hot Chips II, 1990 Symposium on High Performance Chips.

*Primary Examiner*—Krisna Lim
*Assistant Examiner*—Patrice L. Winder

[57] ABSTRACT

A system for storing addresses of instructions being executed in a processor by storing an address of a first instruction in a line of cache or memory in an instruction address queue. With each instruction fetched from the line, the system stores an index into the instruction address queue for the entry that contains the address of the first instruction in the line. For each instruction fetched from the line, the system also stores an offset value indicating the relative position of the instruction within the line. To determine the address of an instruction, the processor uses the index to retrieve the address of the first instruction of the line from the instruction address queue, and then appends the offset value to the end of the value retrieved from the instruction address queue to form the actual memory address of the instruction.

19 Claims, 3 Drawing Sheets

APPARATUS AND METHOD TO REDUCE INSTRUCTION ADDRESS STORAGE IN A SUPER-SCALER PROCESSOR

FIELD OF THE INVENTION

This invention relates to computer systems and more particularly to processors within such computer systems. Even more particularly, the invention relates to storing the addresses of instructions being executed within a processor.

BACKGROUND OF THE INVENTION

Conventional processor designs, typically using a RISC instruction set, often use a pipelined architecture wherein several instructions are processed concurrently. In a pipelined architecture, instructions are often processed in three stages, although the number of stages can vary. In the first stage, called fetch, the instruction is fetched from either cache or main memory into the processor. In the second stage, called issue, the resources needed by the instruction are analyzed, and if these resources are available, the instruction is issued to the execution unit to be performed. In the third stage, called execution, the work of the instruction is performed and its results stored into the processor registers or into memory depending upon the instruction type.

During both the issue and execution stages, the instruction is stored inside the processor, typically within a small high-speed memory area called an instruction queue. Because of the nature of the pipelined architecture, several instructions are always being fetched ahead of the instructions actually being executed. Therefore, the program counter, which contains the instruction address of the next instruction to be fetched, is far ahead of the addresses of the instructions being executed. When something occurs that interrupts the normal progression of instruction execution, for example a branch instruction to a new location or a processor trap caused by some external interrupt, the processor needs to determine the program counter location of the last instruction that was executed before the branch or trap, or more accurately, the instruction address of the next instruction that would have been executed had the branch or trap not occurred. Since the actual program counter is far ahead of the last instruction being executed, the actual program counter cannot be used to identify the last instruction.

To identify the value of the instruction address of the next instruction to be executed, the processor must be able to identify the instruction address of each instruction contained with the instruction queue. In prior art systems, the instruction address is stored along with the instruction inside the instruction queue, thus the processor merely has to fetch the instruction address bits from the instruction queue. This, however, requires a large amount of very high-speed memory inside the processor. For example, if a processor can concurrently execute 64 instructions and each instruction has a 64 bit address, 4096 bits of storage would be required to contain the instruction addresses for all the instructions contained in the instruction queue.

Because prior art processors typically only executed three to ten instructions concurrently, the requirements of storing the instruction address along with the instruction inside the instruction queue were not very large. As processors increase in capacity, and increase in the number of concurrent instructions that can be processed, the memory requirements for storing the instruction addresses inside the instruction queue become very large.

One prior art system, published in European Patent Application 043277482 entitled "Processor Architecture with Decoupled Instruction Fetching" of Valeri Popescu, published Jun. 19, 1991, discloses a system that separates the storage location of the instruction addresses from the instruction queue. This system, however, still stores the instruction address for each instruction in the processor, thus using large amounts of high-speed memory. In this system, each instruction in the instruction queue contains an Id which is used to reference the instruction address stored in a register file called the "Sane PC File". There is a one to one correspondence between instructions in the instruction queue and instruction addresses stored in the Sane PC File, thus the amount of storage needed is the same as would be needed to store the instruction address along with the other instruction bits in the instruction queue. Presumably, storing the instructions addresses in this manner allows the Sane PC File to be a different type of memory, or stored at a different location on the processor integrated circuit.

There is need in the art then for an apparatus and method used to store instruction addresses inside a pipeline architecture processor, wherein the apparatus and method reduces the storage requirements for storing the instruction address. There is a further need in the art for such an apparatus and method that stores fewer than one instruction address per instruction being executed. The present invention meets these and other needs in the art.

SUMMARY OF THE INVENTION

It is an aspect of the present invention to store the addresses of instructions being executed within a processor of a computer system.

It is another aspect of the invention to store less than one address per instruction being executed, and to store such address within an instruction address queue within the processor.

Another aspect of the invention is to expand each instruction being executed to provide storage for index information, used to access the instruction address queue, and offset information, needed to provide additional address information.

A further aspect of the invention is to use the index information of an expanded instruction to access a portion of the instruction address queue to extract part of an address of the instruction, and to combine the extracted part with the offset information to form an address of the instruction.

The above and other aspects of the invention are accomplished in a system comprising an apparatus and method for storing instruction addresses separate from the instruction queue within a processor. The system stores some instruction addresses in an instruction address queue, and references these instruction addresses using index and offset information stored in the instruction queue. In the instruction address queue, the system stores the instruction address of the first instruction contained in a line of cache memory. For each instruction fetched from the line of cache memory, the system stores an index in the instruction queue that identifies the entry in the instruction address queue which contains the address of the first instruction in the line of cache memory, and the system stores an offset value indicating the relative position of the instruction within the line of cache memory. Thus the storage requirements are reduced to storing one instruction address per cache line, regardless of the number of instructions contained in the cache line, plus storing the index and offset values in each instruction in the instruction queue.

When the processor needs to determine the instruction address of an instruction, the processor uses the index contained within the instruction to retrieve a value from the instruction address queue, and then it appends the offset value contained in the instruction to the end of the value retrieved from the instruction address queue. When combined, these bits represent the actual memory address of the instruction.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
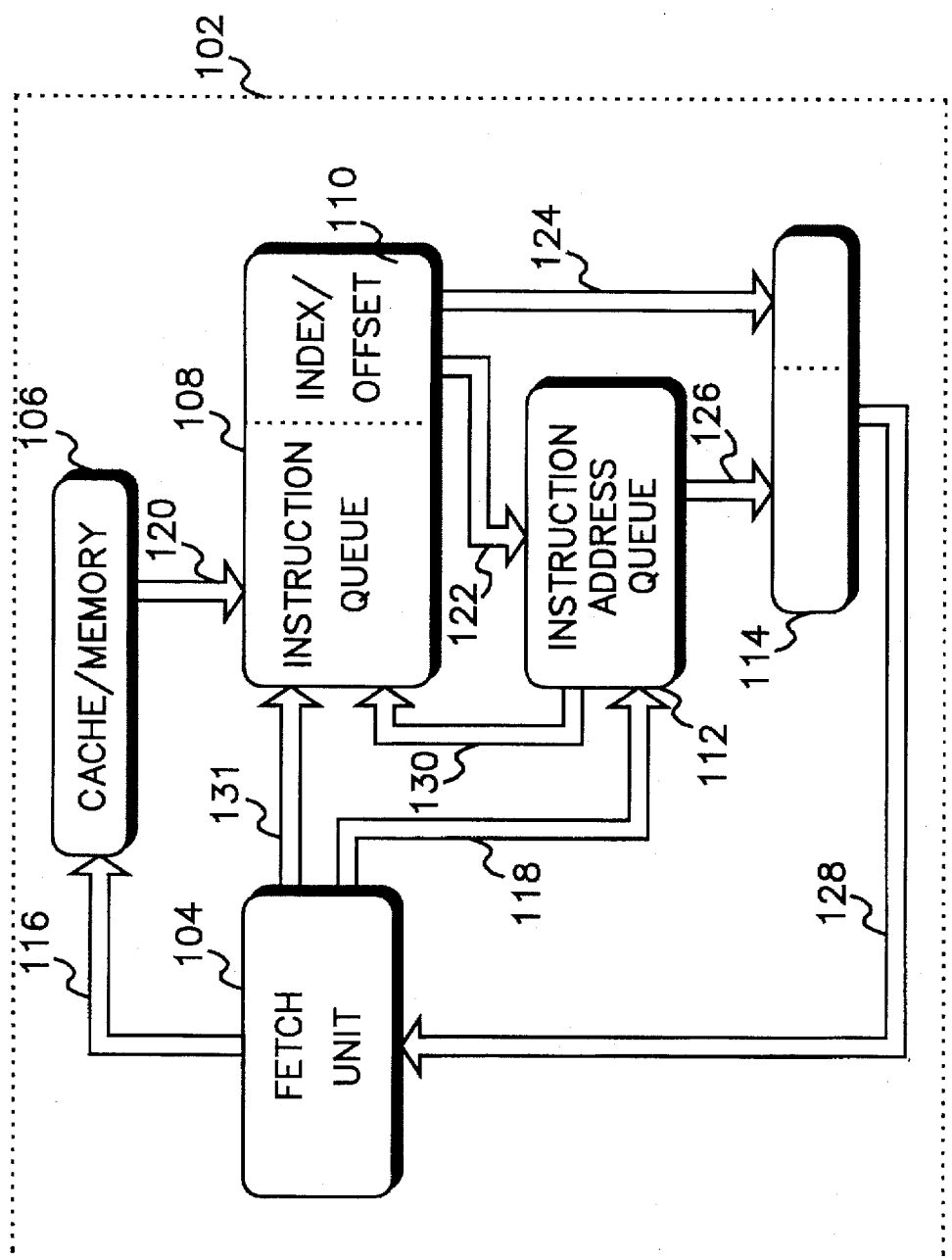
FIG. 1 shows a block diagram of part of a computer system processor, and illustrates the instruction address queue, index information and offset information of a first embodiment of the present invention.

FIG. 1 shows a block diagram of the preferred embodiment of the present invention. Referring to FIG. 1, the area outlined by dotted line 102 shows a portion of a processor within a computer system. A fetch unit 104 sends an address over a bus 116 to a conventional cache or memory element 106. Using the address on the bus 116, the cache or memory element 106 retrieves data and sends it over a bus 120 to an instruction queue 108.

When the address for the instruction is sent over the bus 116, that same address is sent over a bus 118 and stored into an instruction address queue 112. Also at the same time, the address of the location in the instruction address queue that was just used to store the instruction address is sent by the instruction address queue over a bus 130 to the instruction queue 108 as an index value. In the preferred embodiment, the instruction address queue has sixteen locations for storing instruction addresses, thus four bits are needed for the index value. When the instruction is received on the bus 120, the bits comprising the instruction are combined with the index received on the bus 130 and stored into the instruction queue 108. For illustrative purposes the index bits are shown as being located in a separate index/offset area 110, however, these bits are simply stored as part of the instruction in the instruction queue.

The Cache/Memory 106 is organized as groups of bytes called a line. In the preferred embodiment, a cache line contains thirty two bytes, organized as eight words of four bytes each. In the preferred embodiment, each instruction is one word long, thus each cache line holds eight instructions. Only the address of the first instruction in each cache line is stored in the instruction address queue.

When the index information is sent to the instruction queue 108, the fetch unit 104 sends an offset value that represents the relative position of the instruction within the cache line, over a bus 131. The first instruction in the cache line has an offset value of zero, the second instruction has an offset value of one, the third instruction has an offset value of two, etc., and the last instruction has an offset value of seven. Thus, in the preferred embodiment, three bits are used to store the offset value in the instruction queue.

Since the instruction address for the instructions in each cache line is stored in the instruction address queue only once for all eight instructions contained in a cache line, the amount of storage needed to store instruction addresses is reduced almost by a factor of eight.

By way of example, if the fetch unit 104 retrieves an instruction that is the third instruction in a cache line, and the instruction address of the first instruction of the cache line has already been stored in the instruction address queue at location eight, then the index bits sent to the instruction queue for the instruction just fetched would have a value of eight, and the offset bits would have a value of two, to represent the third instruction.

When a branch instruction, or a processor trap, causes the flow of execution to change to a new address in memory, the instruction queue 108 causes the index contained in the last instruction executed to be sent over a bus 122 to the instruction address queue 112. When the instruction address queue 112 receives the address over the bus 122, it retrieves the contents of the location at the address on the bus 122 and sends the retrieved contents over a bus 126 to a register 114. At the same time, the instruction queue causes the offset information stored within the instruction to be sent over a bus 124 where it is combined with the information from the address queue in the register 114. Thus, the register 114 now contains the instruction address of the last instruction executed before the branch or trap occurred. This address is sent over a bus 128 to the fetch unit. Those skilled in the art will recognize that register 114 could be bypassed, and the information from bus 126 and bus 124 simply combined onto bus 128.

The register 114 combines the address information sent over bus 126 with the offset information sent over bus 124 by concatenating the offset information to the address information. This is possible because in the preferred embodiment, the first instruction in each cache line is located on a thirty-two byte boundary. In other embodiments, this restriction could be removed by adding the offset bits to the address retrieved from the instruction address queue.

When the next instruction to be executed is the target of a taken branch, the instruction address queue always stores the full, non-cache aligned, address. This is convenient for an architecture that has "delayed branching", wherein a branch does not take affect until the instruction after the branch. If the current instruction is the next instruction after a branch, the system allows the current instruction to obtain the address of the next instruction by looking at the contents of its index+1 in the instruction address queue.

Figure 2:
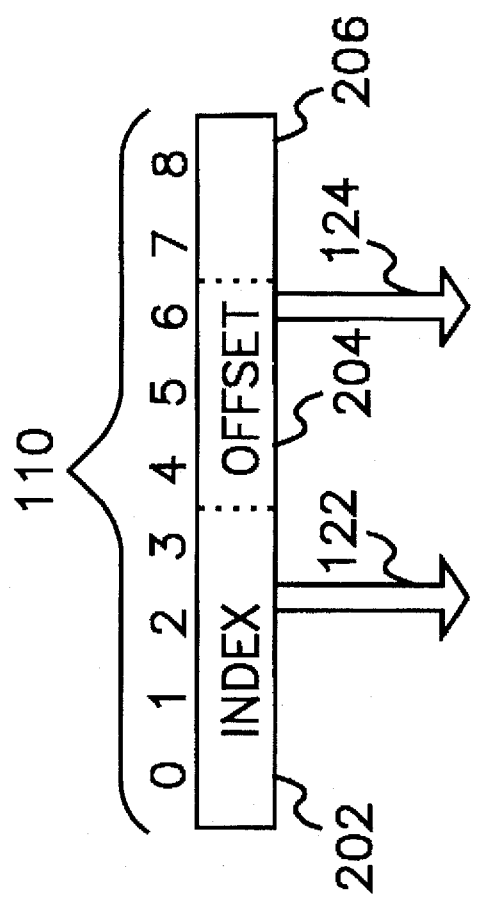
FIG. 2 shows a diagram of the index and offset information stored in each expanded instruction within the instruction queue of FIG. 1.

FIG. 2 shows an expanded diagram of the bits contained within the index/offset information 110. Referring to FIG. 2, in the preferred embodiment, the instruction address queue 112 (FIG. 1) contains sixteen locations for storing instruction addresses. Index information 202 contained within the index/offset information 110 is four bits in length, to address each of the sixteen locations contained within the instruction address queue 112.

In the preferred embodiment, a line of data within the cache/memory 106 (FIG. 1) will hold eight instructions. To complete the instruction address, therefore, the offset information in the index/offset area 110 must contain three bits, to address any one of the eight instructions in a cache line. Area 204 shows the three bits of the offset and indicates that these three bits are sent over the bus 124.

In the processor of the preferred embodiment, memory is addressable at a byte level, however, instructions are all four bytes long, thus comprising one word each. Also, instructions must be located on a four byte boundary, therefore the low order two address bits are not necessary to address an instruction. Because of this, although these bits are stored in the index/offset information 110, they are not needed to form the instruction address. These bits are shown in area 206, and are not sent over either bus 122 or bus 124.

Figure 3:
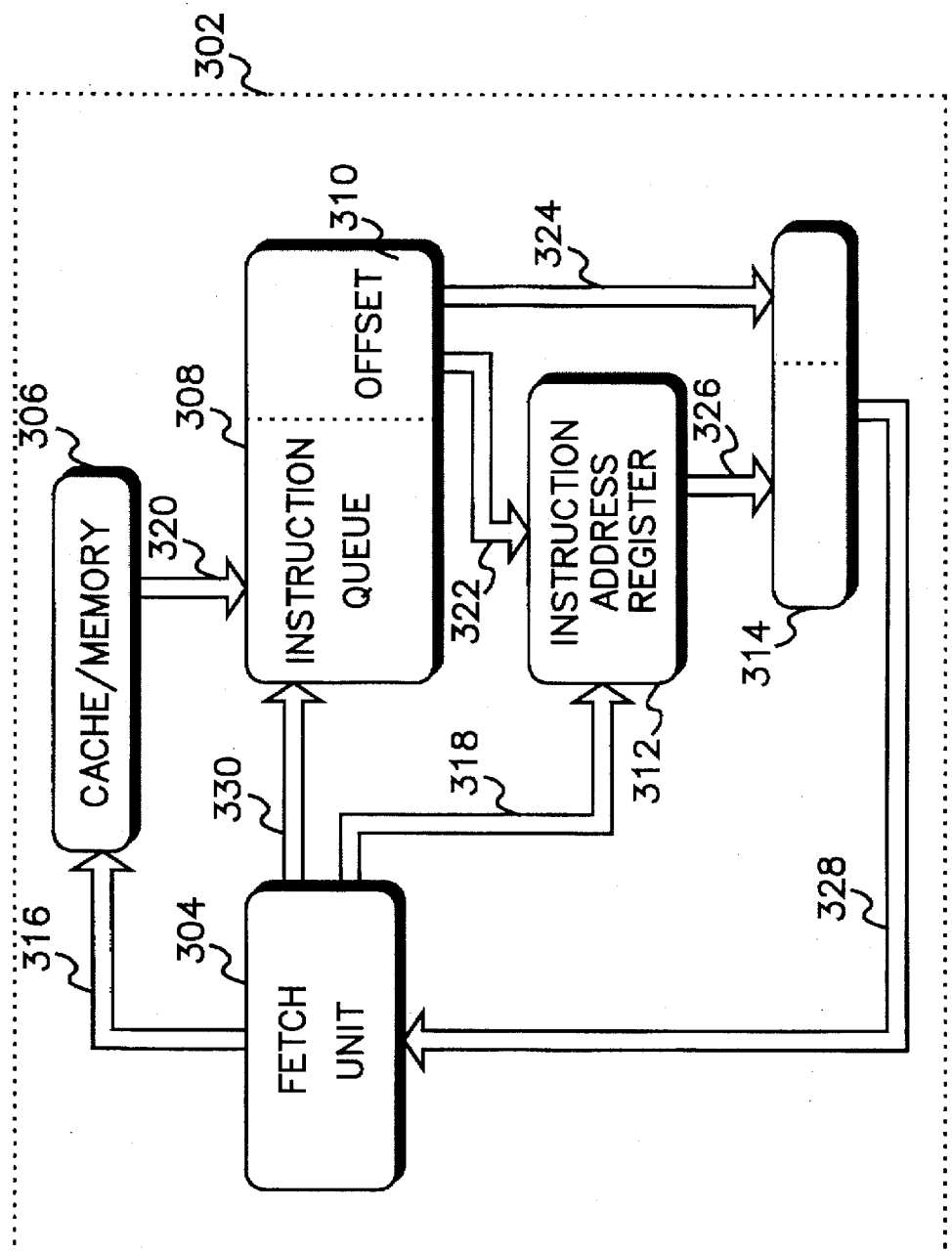
FIG. 3 shows a block diagram of part of a computer system processor, and illustrates the instruction address register, and offset information of a second embodiment of the present invention.

FIG. 3 shows a block diagram of an alternative embodiment of the present invention. In this embodiment, the instruction address queue 112 of FIG. 1 is reduced to an instruction address register. Referring to FIG. 3, the area outlined by dotted line 302 shows a portion of a processor within a computer system. A fetch unit 304 sends an address over a bus 316 to a conventional cache or memory element 306. Using the address on the bus 316, the cache or memory element 306 retrieves data and sends it over a bus 320 to an instruction queue 308.

When the address for the instruction is sent over the bus 316, that same address is sent over a bus 318 and stored into an instruction address register 312.

The Cache/Memory 306 is organized as groups of bytes called a line. In the preferred embodiment, a cache line contains thirty two bytes, organized as eight words of four bytes each. In the preferred embodiment, each instruction is one word long, thus each cache line holds eight instructions. Only the address of the first instruction in each cache line is stored in the instruction address register.

At the same time the fetch unit 304 sends the address to the cache/memory 306 and the instruction address register 312, it also sends an offset value that represents the relative position of the instruction within the cache line, over a bus 330 to the instruction queue 308. The first instruction in the cache line has an offset value of zero, the second instruction has an offset value of one, the third instruction has an offset value of two, etc., and the last instruction has an offset value of seven. Thus, in the preferred embodiment, three bits are used to store the offset value in the instruction queue.

When the instruction is received on the bus 320, the bits comprising the instruction are combined with the offset received on the bus 330 and stored into the instruction queue 308.

Since the instruction address for the instructions in each cache line is stored in the instruction address register only once for all eight instructions contained in a cache line, the amount of storage needed to store instruction addresses is reduced almost by a factor of eight.

When a branch instruction, or a processor trap, causes the flow of execution to change to a new address in memory, the fetch unit 304 sends information over bus 330 that causes the offset information stored within the instruction to be sent over a bus 324 where it is combined with the information from the instruction address register in the register 314. Thus, the register 314 now contains the instruction address of the last instruction executed before the branch or trap occurred. This address is sent over a bus 328 to the fetch unit.

Those skilled in the art will also recognize that the present invention may be expressed as a method for storing address of a first of a group of instructions being executed, wherein the address is stored in a storage area, such as the instruction address queue; storing index information within each of the group of instructions being executed, wherein the index information indicates an address within the storage area wherein the address of the first of the group of instructions is stored; storing offset information within each of the group of instructions being executed, wherein the offset indicates a relative address of each instruction within the group of instructions beyond the first of the group; using the index information to address the storage area to retrieve the address of the first of the group of instructions being executed; and combining the address retrieved with the offset information to recreate the address of an instruction.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A circuit for storing addresses of instructions being executed within a processor of a computer system, and for recreating said addresses, said circuit comprising:

an instruction address register;

an instruction storage area;

a fetch unit for retrieving said instructions and storing said instructions in said instruction storage area, wherein every instruction retrieved is part of one of a plurality of groups of instructions, and wherein for each instruction retrieved by said fetch unit, said fetch unit stores, in said instruction address register, an address of a first instruction of said one of said plurality of groups of instructions that contain said each instruction, and further wherein said fetch unit stores offset information within said each instruction in said instruction storage area, wherein said offset information represents a relative position of said each instruction within said one of said plurality of groups of instructions that contain said each instruction; and a bus circuit for combining said address from said instruction address register and offset information from a selected instruction in said instruction storage area to recreate an address of said selected instruction.

2. The circuit of claim 1 wherein said bus circuit combines said address retrieved with said offset information by concatenating said offset information onto said address retrieved.

3. The circuit of claim 1 wherein said bus circuit combines said address retrieved with said offset information by adding said offset information to said address retrieved.

4. The circuit of claim 1 wherein less than all of said offset information is combined with said address retrieved to recreate said address of an instruction.

5. The circuit of claim 1 wherein said bus circuit further comprises a register for storing said address retrieved and said offset information information.

6. The circuit of claim 1 wherein said each of said plurality of groups of instructions comprises instructions contained within a single line of a cache.

7. A circuit for storing addresses of instructions being executed within a processor of a computer system, and for recreating said addresses, said circuit comprising:

an instruction address queue for storing at least one address;

an instruction queue for storing at least one instruction;

a fetch unit for retrieving said instructions and storing said instructions in said instruction queue wherein every instruction retrieved is part of one of a plurality of groups of instructions, and wherein for each instruction retrieved by said fetch unit, said fetch unit stores, in said instruction address queue, an address of a first instruction of said one of said plurality of groups of instructions that contains said each instruction, and further wherein said fetch unit stores index information within said each instruction in said instruction queue, wherein said index information represents a location within said instruction address queue that contains an address of a first instruction in said one of said plurality of groups of instructions containing said each instruction, and still further wherein said fetch unit stores offset information within said each instruction in said instruction queue, wherein said offset information represents a relative position of said each instruction within said one of said plurality of groups of instructions containing said each instructions;

an address circuit for recreating an address of a selected instruction from said instruction queue using index information from said selected instruction to address said instruction address queue to retrieve said address from a location represented by said index; and a bus circuit for combining said address retrieved by said address circuit and said offset information from said selected instruction to recreate an address of said selected instruction.

8. The circuit of claim 7 wherein said bus circuit combines said address retrieved with said offset information by concatenating said offset information onto said address retrieved.

9. The circuit of claim 7 wherein said bus circuit combines said address retrieved with said offset information by adding said offset information to said address retrieved.

10. The circuit of claim 7 wherein less than all of said offset information is combined with said address retrieved to recreate said address of an instruction.

11. The circuit of claim 7 wherein said bus circuit further comprises a register for storing said address retrieved and said offset information.

12. The circuit of claim 7 wherein each of said plurality of groups of instructions comprises instructions contained within a single line of a cache.

13. The circuit of claim 7 wherein said fetch unit only stores said address of said first instruction of said one of said plurality of groups of instructions that contains said each instruction when said address of said first instruction is not already stored in said instruction address queue.

14. A method for storing addresses of instructions being executed within a processor of a computer system, and for recreating said addresses, said method comprising the steps of:

(a) retrieving an instruction from a memory of said computer system, wherein said instruction retrieved is part of one of a plurality of groups of instructions, and storing said instruction in an instruction storage area;

(b) storing an address of a first instruction of said one of said plurality of groups of instructions containing said instruction retrieved in step (a) in an instruction address storage area;

(c) storing index information within said instruction retrieved in step (a), wherein said index information represents a location within said instruction address storage area wherein said address of said first instruction of said one of said plurality of groups of instructions containing said instruction retrieved in step (a) is stored;

(d) storing offset information within said instruction retrieved in step (a) wherein said offset information represents a relative position of said instruction retrieved in step (a) within said one of said plurality of groups of instructions containing said instruction retrieved in step (a);

(e) using said index information to address said instruction address storage area to retrieve said address of said first instruction of said one of said plurality of groups of instructions containing said instruction retrieved in step (a); and (f) combining said address retrieved in step (e) with said offset information to recreate an address of said instruction retrieved in step (a).

15. The method of claim 14 wherein step (f) combines said address retrieved with said offset information by concatenating said offset information onto said address retrieved.

16. The method of claim 14 wherein step (f) combines said address retrieved with said offset information by adding said offset information to said address retrieved.

17. The method of claim 14 wherein step (f) combines less than all of said offset information with said address retrieved to recreate said address of an instruction.

18. The method of claim 14 wherein each of said plurality of groups of instructions comprise instructions stored within a single line of a cache located in said computer system.

19. The method of claim 14 wherein step (b) further comprises storing said address of said first instruction of said one of said plurality of groups of instructions containing said instruction retrieved in step (a) when said address of said first instruction is not already stored in said instruction address storage area.

* * * * *